(12) United States Patent
Xiao et al.

(10) Patent No.: US 9,798,193 B2
(45) Date of Patent: Oct. 24, 2017

(54) METHOD FOR MANUFACTURING A DISPLAY PANEL, DISPLAY PANEL AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Yin Xiao, Beijing (CN); Feng Liu, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 2 days.

(21) Appl. No.: 14/520,278

(22) Filed: Oct. 21, 2014

(65) Prior Publication Data
US 2015/0323838 A1 Nov. 12, 2015

(30) Foreign Application Priority Data
May 6, 2014 (CN) .............................. 2014 0 188829

(51) Int. Cl.
G02F 1/1337 (2006.01)

(52) U.S. Cl.
CPC .. *G02F 1/133788* (2013.01); *G02F 1/133723* (2013.01); *G02F 1/133784* (2013.01); *G02F 2001/133773* (2013.01)

(58) Field of Classification Search
CPC ... G02F 2001/013373; G02F 1/133784; G02F 1/133788
See application file for complete search history.

(56) References Cited

U.S. PATENT DOCUMENTS 5,629,786 A * 5/1997 Ogura ................... G02F 1/1397
349/106
6,040,885 A * 3/2000 Koike ............... G02F 1/133753
349/123
(Continued)

FOREIGN PATENT DOCUMENTS

CN 1591143 A 3/2005
CN 1746750 A 3/2006
(Continued)

OTHER PUBLICATIONS

Office Action in Chinese Application No. 201410188829.9 dated Oct. 28, 2016, with English translation. 11 pages.
(Continued)

*Primary Examiner* — Phu Vu
(74) *Attorney, Agent, or Firm* — Blakely Sokoloff Taylor & Zafman LLP

(57) ABSTRACT

The present disclosure discloses a method for manufacturing a display panel, a display panel and a display device, the display panel comprising a first substrate and a second substrate, a polyimide film being formed on both of the first substrate and the second substrate, wherein the method for manufacturing a display panel comprises: aligning the polyimide film on one of the first substrate and the second substrate using a rubbing alignment process, aligning the polyimide film on the other substrate using an optical alignment process. The method for manufacturing a display panel of the present disclosure uses the rubbing alignment process and the optical alignment process simultaneously so as to improve the display quality of the display panel effectively and avoid shortcomings of a certain performance when using one of the alignment processes separately.

18 Claims, 3 Drawing Sheets

```
┌─────────────────────────────────────────────────┐
│ aligning the polyimide film on one substrate   │──S1
│ using the rubbing alignment process             │
└─────────────────────────────────────────────────┘
                        │
                        ▼
┌─────────────────────────────────────────────────┐
│ aligning the polyimide film on the other       │──S2
│ substrate using the optical alignment process   │
└─────────────────────────────────────────────────┘
```

(56) References Cited

U.S. PATENT DOCUMENTS

| | | | |
|---|---|---|---|
| 7,442,494 B2* | 10/2008 | Park | G02F 1/133784 |
| | | | 349/124 |
| 2001/0000438 A1 | 4/2001 | Kim et al. | |
| 2006/0050222 A1 | 3/2006 | Park | |
| 2006/0139538 A1 | 6/2006 | Park | |
| 2015/0275089 A1* | 10/2015 | Katano | G02F 1/133723 |
| | | | 349/124 |

FOREIGN PATENT DOCUMENTS

| | | |
|---|---|---|
| CN | 1797127 A | 7/2006 |
| CN | 101251685 A | 8/2008 |
| CN | 100421016 C | 9/2008 |
| CN | 101542373 | 9/2009 |
| CN | 101823789 A | 11/2010 |
| CN | 103091903 | 5/2013 |

OTHER PUBLICATIONS

Office Action in Chinese Application No. 201410188829.9 dated Aug. 18, 2016, with English translation. 11 pages.

Chinese Office Action with English Language Translation dated Mar. 22, 2016, Chinese Application No. 201410188829.9.

\* cited by examiner

METHOD FOR MANUFACTURING A DISPLAY PANEL, DISPLAY PANEL AND DISPLAY DEVICE

FIELD OF THE DISCLOSURE

The present disclosure relates to the technical field of TFT-LCD, specifically to a method for manufacturing a display panel, a display panel and a display device.

BACKGROUND OF THE DISCLOSURE

With the progress of the society and the development of science and technology, the thin film field effect transistor liquid crystal display (TFT-LCD) has become the mainstream product in the field of display nowadays, which plays a crucial role in industrial production and daily life, and has got more and more favour of people.

Liquid crystal alignment is a necessary link in production of liquid crystal panels. The rubbing technology is widely used in the current TFT-LED industry to rub the glass substrate, such that trenches of a certain angle are formed at the surface of polyimide molecules, the liquid crystal molecules are arranged along the trenches to achieve the purpose of alignment. The rubbing process is relatively simple and convenient, it is the current mainstream technology and has a lot of advantages, such as the process is mature, the rubbing alignment stability is good; it is convenient for implementation and the operation is easy. However, many disadvantages still exist currently: nonuniform rubbing results in nonuniformity of alignment of the liquid crystal molecules, which influences the display quality; when the rubbing cloth rubs the substrate, the surface of the substrate may be easily scratched, which may cause quality defects; many rubbing debris (such as polyimide debris, cloth hair debris) may be produced in the rubbing which may pollute the liquid crystal, and may cause display defects such as Mura etc.; the IPS-type liquid crystal screen has a relatively high requirement on the image quality, however, the rubbing process could hardly meet the requirements (such as relatively low contrast etc.) of the high pixel display; static electricity generated by rubbing may easily break down the display elements on the array substrate, which may result in bad display.

Therefore, a new liquid crystal alignment technology, i.e. optical alignment process, rises gradually in the industry, i.e., a method of initiating photopolymerization, photoisomerization or photodecomposition reaction to the optical alignment material film on the substrate through UV irradiation, so as to generate anisotropy of the surface, thereby inducing alignment of liquid crystal molecules, this method is a non-contact liquid crystal alignment technology and has overcome the shortcomings of the rubbing alignment. The optical alignment process adopts non-contact exposure, which would not damage the surface of the PI film and could prevent light leakage, such that the luminance in the dark state is lower, while the contrast in the bright state remains unchanged, thereby achieving the requirement of high contrast. The light decomposition materials are also divided into two types, one is small molecule type, which only needs to perform secondary curing process, however, thus produced products still have many defects which are difficult to be solved, such as Mura etc. The other is large molecule type, which needs to perform secondary cleaning, the Mura defect of the product is relatively small, which has a considerable prospect. However, as for the secondary cleaning process, there is not a successful method yet in the industry that can clean up the decomposed residual PI (polyimide) liquid molecules, which influences some performances such as contrast etc., of the product greatly. The defects of the optical alignment process also make the liquid crystal screen have related badness, such as serious afterimage of the display, bad reliability etc.

SUMMARY OF THE DISCLOSURE (I) Technical Problem to be Solved

With respect of the deficiencies of the prior art, the present disclosure aims to providing a method for manufacturing a display panel, which can overcome the current defects caused by separate use of the two alignment processes to some extent and keep the advantages brought by the two alignment processes.

(II) Technical Solution

In order to achieve the above purpose, according to an aspect of the present disclosure, a method for manufacturing a display panel is provided, the display panel comprising a first substrate and a second substrate, a polyimide film being formed on both of the first substrate and the second substrate; the method for manufacturing a display panel comprising:

aligning the polyimide film on one of the first substrate and the second substrate using the rubbing alignment process, aligning the polyimide film on the other substrate using the optical alignment process.

Preferably, the method further comprises: aligning the polyimide film on the first substrate and/or the second substrate using both the rubbing alignment process and the optical alignment process.

Wherein cotton cloth or artificial fiber is used as rubbing cloth in the rubbing alignment process.

Wherein, when the polyimide film is formed on the first substrate and the second substrate prior to the alignment, the substrate on which the rubbing alignment process is to be used is coated with a common polyimide liquid, the substrate on which the optical alignment process is to be used is coated with a photosensitive polyimide liquid.

Wherein ultraviolet light with a wavelength of 200 nm~400 nm is used in the optical alignment process.

Wherein the light accumulation of the ultraviolet is 30 mj/cm$^2$~2000 mj/cm$^2$.

Wherein the optical alignment process further comprises: secondary cleaning, secondary heating curing or secondary UV curing.

Wherein, when aligning the polyimide film on the first substrate and the second substrate, the alignment angle is between ±15°.

According to another aspect of the present disclosure, a display panel is provided, being manufactured by a manufacturing method stated above.

According to a further aspect of the present disclosure, a display device is provided, comprising a display panel stated above.

(III) Beneficial Effect

The present disclosure at least has the following beneficial effect:

In the present disclosure, when manufacturing a display panel, one of the first substrate and the second substrate is aligned using the rubbing alignment process, the other is aligned using the optical alignment process respectively, the rubbing alignment process can improve anchoring force of liquid crystal molecules, which is favorable for overcoming the problems of serious afterimages and bad reliability easily caused by the optical alignment process. Whereas since the optical alignment process is a non-rubbing technology, it can improve light leakage, reduce the pretilt angle of the liquid crystal molecules, and increase the contrast. The simultaneous use of the rubbing alignment process and the optical alignment process can improve the display quality of the display panel effectively and avoid shortcomings of a certain performance when using one of the alignment processes separately.

BRIEF DESCRIPTION OF THE DRAWINGS

In order to explain the technical solutions in the embodiments of the present or in the prior art more clearly, the drawings that need to be used in the depiction of the embodiments or the prior art will be introduced briefly in the following, apparently, the drawings described below are only some embodiments of the present disclosure, the ordinary skilled person in the art can also obtain other drawings based on these drawings without paying any creative work.

DETAILED DESCRIPTION OF THE DISCLOSURE

Next, the technical solutions in the embodiments of the present disclosure will be described clearly and completely in combination with the drawings in the embodiments of the present disclosure, apparently, the embodiments described are only part rather than all of the embodiments of the present disclosure. Based on the embodiments in the present disclosure, all the other embodiments obtained by the ordinary skilled person in the art without paying any creative work belong to the scope of the present disclosure.

Figure 1:
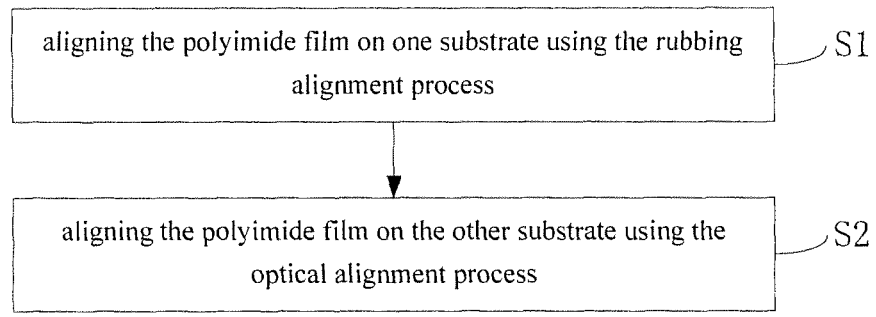
FIG. 1 is a method for manufacturing a display panel according to a first embodiment of the present disclosure.

In a method for manufacturing a display panel according to an embodiment of the present disclosure, the display panel comprises a first substrate and a second substrate, a polyimide film is formed on both of the first substrate and the second substrate; as shown in FIG. 1, the method for manufacturing a display panel comprises the steps of: step S1, aligning the polyimide film on one of the first substrate and the second substrate using the rubbing alignment process; step S2, aligning the polyimide film on the other substrate using the optical alignment process. The method will be explained in detailed with three embodiments below. In the three embodiments, the first substrate and the second substrate are embodied as an array substrate and a color filter substrate, however, the skilled person in the art should know that this is only illustration in the form of an example. The first substrate and the second substrate may also be substrates of other forms, certainly, no matter they are substrates of what forms, they belong to the protection scope of the present disclosure as long as they meet the definition of the claims.

Figure 2:
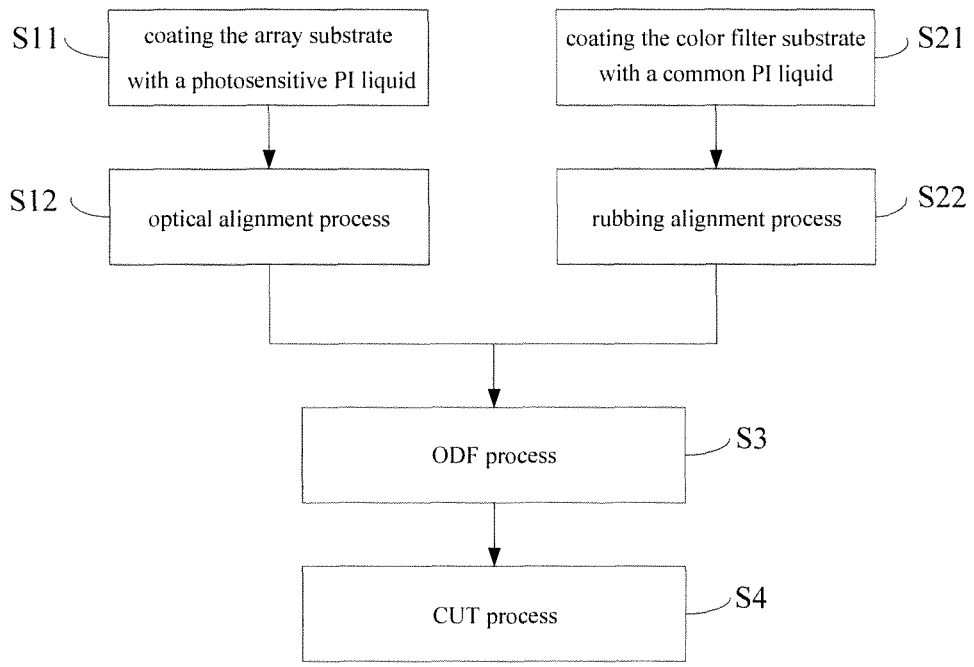
FIG. 2 is a flow chart of a method for manufacturing a display panel according to a first embodiment of the present disclosure.

Referring to FIG. 2, the specific step of the method for manufacturing a display panel in the first embodiment is as follows:

Step S11: coating the array substrate with a photosensitive polyimide (PI) liquid to form a polyimide (PI) film.

Wherein the thickness of the PI film is preferable 1 nm~120 nm.

Step S12: performing optical alignment to the PI film formed on the array substrate.

In this step, the optical alignment specifically comprises: polarized ultraviolet light irradiation and secondary processing. Moreover, multiple polarized ultraviolet light irradiation can be performed to the same substrate.

The wavelength of the ultraviolet light used is preferably 200 nm~400 nm, and the light accumulation of the ultraviolet light is preferably 30 mj/cm$^2$~2000 mj/cm$^2$.

The secondary processing includes: 1) secondary cleaning: cleaning using strong oxidizing substances such as ozone gas etc., or hydrogen peroxide solution; or using organic solvents with strong solubility such as mixed solutions of isopropyl alcohol and water, or propylene glycol monomethyl ether acetate and water; or using an ultrasonic device together with the above two kinds of cleaning substances and solutions. 2) secondary heating curing: using the manner of heating, placing the substrate after the optical alignment in a heating furnace, and roasting for a certain period of time under a certain temperature. 3) secondary UV curing: after box-aligning of the array substrate and the color filter substrate, performing the UV light irradiation process. In actual applications, one of the secondary processing is selected based on the difference of the polyimide film material composition.

When performing optical alignment to the PI film, the alignment angle is preferably 0°~±15°.

Step S21: coating the color filter substrate with a common PI liquid to form a PI film.

The thickness of the PI film is preferably 1 nm~120 nm.

Step S22: performing rubbing alignment to the PI film formed on the color filter substrate.

In this step, the rubbing alignment process is used to the color filter substrate, the rubbing cloth used includes: cotton cloth and artificial fiber, and the same substrate can be rubbed for several times. When the rubbing alignment is performed to the PI film, the alignment angle is preferably 0°~±15°.

Step S3: ODF (one drop filling) process

In this step, the ODF process specifically includes: liquid crystal injection, frame sealing glue coating and box aligning.

Step S4: CUT (cutting) process

In this step, the CUT process specifically includes: cutting the large size display panel formed after the box aligning into a plurality of small size display panels.

It should be understood that the processing steps of performing the optical alignment process to the PI film on the array substrate and performing the rubbing alignment process to the PI film on the color filter substrate can be performed simultaneously or successively.

It should also be understood that manufacturing a display panel further comprises other process steps, which will not be repeated here.

Figure 3:
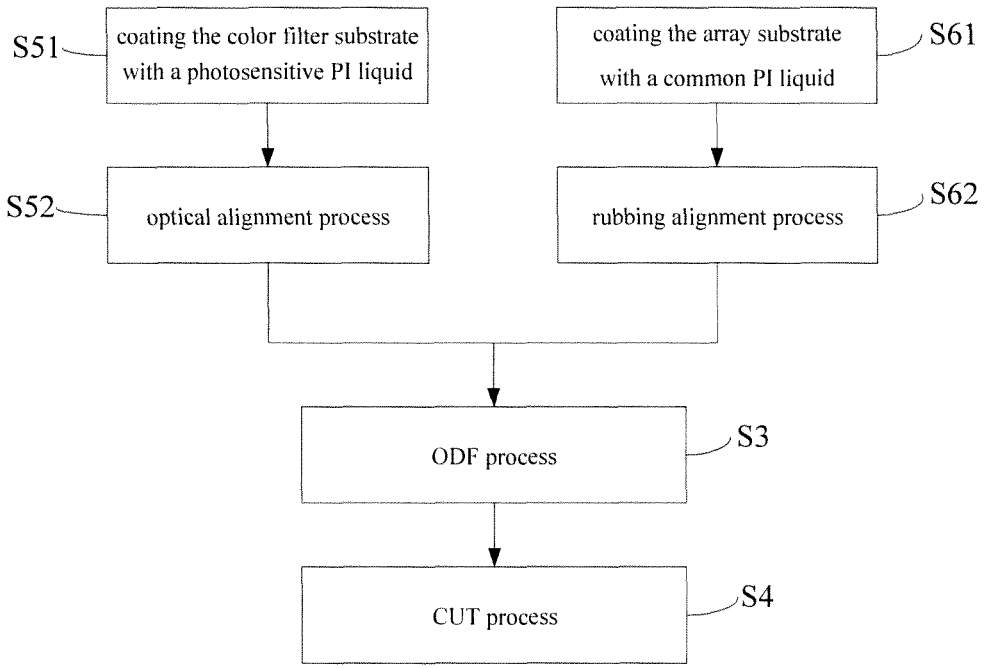
FIG. 3 is a flow chart of a method for manufacturing a display panel according to a second embodiment of the present disclosure.

Referring to FIG. 3, the specific steps of a method for manufacturing a display panel in the second embodiment are as follows:

Step S51: coating the color filter substrate with a photosensitive polyimide (PI) liquid to form a PI film.

Wherein the thickness of the PI film is preferably 1 nm~120 nm.

Step S52: performing optical alignment to the PI film formed on the color filter substrate.

In this step, the optical alignment specifically comprises: polarized ultraviolet light irradiation and secondary processing. Moreover, multiple polarized ultraviolet light irradiation can be performed to the same substrate.

The wavelength of the ultraviolet light used is preferably 200 nm~400 nm, and the light accumulation of the ultraviolet light is preferably 30 mj/cm$^2$~2000 mj/cm$^2$.

The secondary processing includes: 1) secondary cleaning: cleaning using strong oxidizing substances such as ozone gas etc., or hydrogen peroxide solution; or using organic solvents with strong solubility such as mixed solutions of isopropyl alcohol and water, or propylene glycol monomethyl ether acetate and water; or using an ultrasonic device together with the above two kinds of cleaning substances and solutions. 2) secondary heating curing: using the manner of heating, placing the substrate after the optical alignment in a heating furnace, and roasting for a certain period of time under a certain temperature. 3) secondary UV curing: after box-aligning of the array substrate and the color filter substrate, performing the UV light irradiation process. In actual applications, one of the secondary processing is selected based on the difference of the polyimide film material composition.

When performing optical alignment to the PI film, the alignment angle is preferably 0°~±15°.

Step S61: coating the array substrate with a common PI liquid to form a PI film.

The thickness of the PI film is preferably 1 nm~120 nm.

Step S62: performing rubbing alignment to the PI film formed on the array substrate.

In this step, the rubbing alignment process is used to the color filter substrate, the rubbing cloth used includes: cotton cloth and artificial fiber, and the same substrate can be rubbed for several times. When the rubbing alignment is performed to the PI film, the alignment angle is preferably 0°~±15°.

Step S3: ODF process

In this step, the ODF process specifically includes: liquid crystal injection, frame sealing glue coating and box aligning.

Step S4: CUT process

In this step, the CUT process specifically includes: cutting the large size display panel formed after the box aligning into a plurality of small size display panels.

Compared with the first embodiment, the second embodiment differs in that the alignment processes used by the color filter substrate and the array substrate are interchanged.

Figure 4:
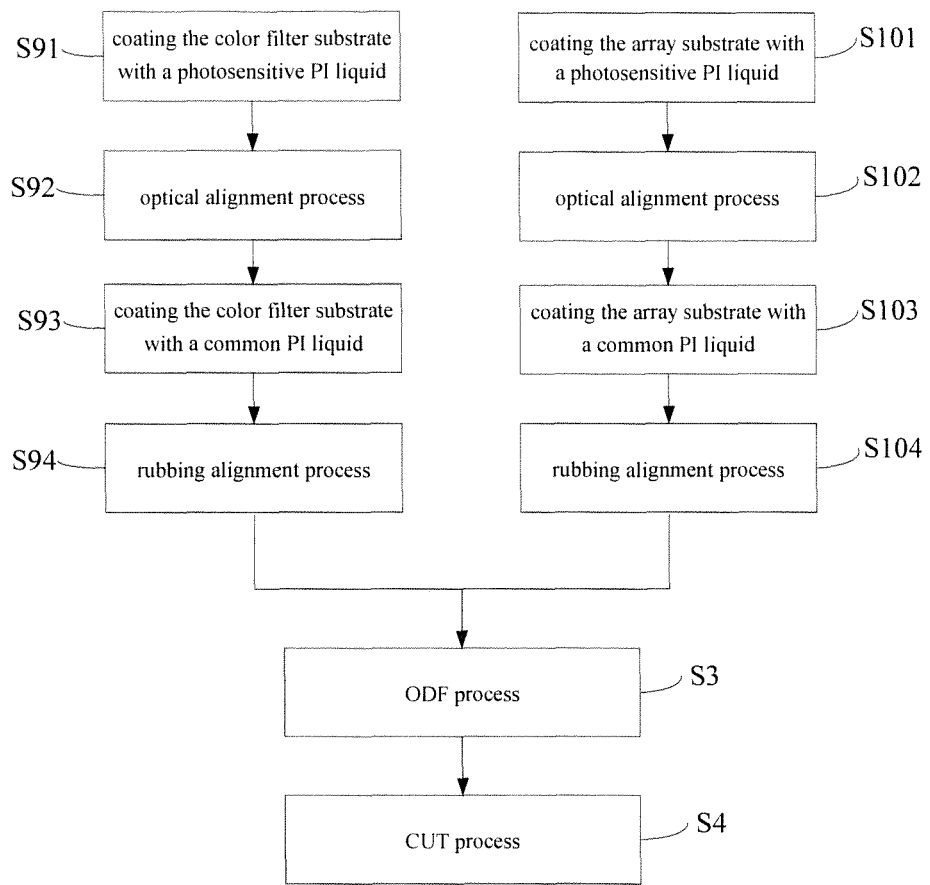
FIG. 4 is a flow chart of a method for manufacturing a display panel according to a third embodiment of the present disclosure

Referring to FIG. 4, the specific steps of a method for manufacturing a display panel in the third embodiment are as follows:

Step S91: coating the color filter substrate with a photosensitive polyimide (PI) liquid to form a first PI film.

Step S92: performing optical alignment to the first PI film on the color filter substrate.

In this step, the optical alignment specifically includes: polarized ultraviolet light irradiation and secondary processing. Moreover, multiple polarized ultraviolet light irradiation can be performed to the same substrate.

The wavelength of the ultraviolet light used is preferably 200 nm~400 nm, and the light accumulation of the ultraviolet light is preferably 30 mj/cm$^2$~2000 mj/cm$^2$.

The secondary processing includes: 1) secondary cleaning: cleaning using strong oxidizing substances such as ozone gas etc., or hydrogen peroxide solution; or using organic solvents with strong solubility such as mixed solutions of isopropyl alcohol and water, or propylene glycol monomethyl ether acetate and water; or using an ultrasonic device together with the above two kinds of cleaning substances and solutions. 2) secondary heating curing: using the manner of heating, placing the substrate after the optical alignment in a heating furnace, and roasting for a certain period of time under a certain temperature. 3) secondary UV curing: after box-aligning of the array substrate and the color filter substrate, performing the UV light irradiation process. In actual applications, one of the secondary processing is selected based on the difference of the polyimide film material composition.

When performing optical alignment to the PI film, the alignment angle is preferably 0°~±15°.

Step S93: coating the color filter substrate with a common PI liquid to form a second PI film.

Step S94: performing rubbing alignment to the second PI film formed on the color filter substrate.

In this step, the rubbing alignment process is used to the color filter substrate, the rubbing cloth used includes: cotton cloth and artificial fiber, and the same substrate can be rubbed for several times. When the rubbing alignment is performed to the PI film, the alignment angle is preferably 0°~±15°.

Step S101: coating the array substrate with a photosensitive polyimide (PI) liquid to form a third PI film.

Step S102: performing optical alignment to the third PI film formed on the array substrate.

In this step, the optical alignment specifically includes: polarized ultraviolet light irradiation and secondary processing. Moreover, multiple polarized ultraviolet light irradiation can be performed to the same substrate.

The wavelength of the ultraviolet light used is preferably 200 nm~400 nm, and the light accumulation of the ultraviolet light is preferably 30 mj/cm$^2$~2000 mj/cm$^2$.

The secondary processing includes: 1) secondary cleaning: cleaning using strong oxidizing substances such as ozone gas etc., or hydrogen peroxide solution; or using organic solvents with strong solubility such as mixed solutions of isopropyl alcohol and water, or propylene glycol monomethyl ether acetate and water; or using an ultrasonic device together with the above two kinds of cleaning substances and solutions. 2) secondary heating curing: using the manner of heating, placing the substrate after the optical alignment in a heating furnace, and roasting for a certain period of time under a certain temperature. 3) secondary UV curing: after box-aligning of the array substrate and the color filter substrate, performing the UV light irradiation process. In actual applications, one of the secondary processing is selected based on the difference of the polyimide film material composition.

When performing optical alignment to the PI film, the alignment angle is preferably 0°~±15°.

Step S103: coating the array substrate with a common PI liquid to form a fourth PI film.

Step S104: performing rubbing alignment to the fourth PI film formed on the array substrate.

In this step, the rubbing alignment process is used to the array substrate, the rubbing cloth used includes: cotton cloth and artificial fiber, and the same substrate can be rubbed for several times. When the rubbing alignment is performed to the PI film, the alignment angle is preferably 0°~±15°.

Step S3: ODF process

In this step, the ODF process specifically includes: liquid crystal injection, frame sealing glue coating and box aligning.

Step S4: CUT process

In this step, the CUT process specifically includes: cutting the large size display panel formed after the box aligning into a plurality of small size display panels.

It should be understood that in the third embodiment, the order of performing the optical alignment process and the rubbing alignment process to the PI film of any substrate can be interchanged; in addition, both of the alignment processes may be adopted for one of the substrates, while only one of the alignment processes is adopted for the other substrate.

Based on the same inventive concept, the embodiment of the present disclosure further provides a display panel manufactured by the above manufacturing method; and a display device comprising the preceding display panel. The display panel and the display device certainly further comprise other devices, which will not be repeated here. The display device may be any product or component with the display function such as an electronic paper, a mobile phone, a tablet computer, a television, a display, a laptop, a digital photo frame, a navigator etc.

In the embodiments of the present disclosure, the rubbing alignment process can improve anchoring force of liquid crystal molecules, which is favorable for overcoming the problems of serious afterimages and bad reliability easily caused by the optical alignment process. Whereas since the optical alignment process is a non-rubbing technology, it can improve light leakage, reduce the pretilt angle of the liquid crystal molecules, and increase the contrast. The simultaneous use of the rubbing alignment process and the optical alignment process in the present disclosure can improve the display quality of the display panel effectively, overcome the defects respectively possessed by the two alignment processes to some extent, and have the advantages of the two alignment processes at the same time. Particularly, by means of cooperation use of the two processes, the performance of the display panel can meet the actual requirement, for example, when a certain performance of the display panel fails to meet the actual requirement due to the shortcomings of one of the alignment processes, only one of the substrates adopts this alignment process while the other substrate adopts the other alignment process, thus the defect thereof is compensated to some extent, said performance will possibly meet the actual requirement.

In addition, both the rubbing alignment process and the optical alignment process are used to perform alignment to the polyimide film on the color filter substrate and/or the array substrate in the third embodiment, specific requirements to some performances of the display panel may be met, i.e., since two alignment processes are used to one or two substrates thereof, some performances of the thus manufactured panel can meet specific requirements.

The above embodiments are only used for explaining the technical solution of the present disclosure rather than limitations to it; although the present disclosure has been explained in detail with reference to the preceding embodiments, the ordinary skilled person in the art should understand that he/she can still make modifications to the technical solutions stated in the preceding embodiments, or make equivalent replacements to part of the technical features thereof; however, these modifications or replacements do not make the essence of the corresponding technical solutions depart from the spirit and scope of the technical solutions of the embodiments of the present disclosure.

The invention claimed is:

1. A method for manufacturing a display panel, the display panel comprising a first substrate and a second substrate, a polyimide film being formed on both of the first substrate and the second substrate, wherein the method for manufacturing a display panel comprises:
aligning the polyimide film only on one of the first substrate and the second substrate using a rubbing alignment process, aligning the polyimide film only on the other substrate using an optical alignment process,
and wherein the optical alignment process further comprises: irradiating the other substrate with polarized ultraviolet light, and after said irradiating, performing a secondary cleaning of the first and second substrate, and one of secondary heating curing and secondary UV curing of the first and second substrate.

2. The method according to claim 1, wherein the method further comprises: aligning the polyimide film on the first substrate and/or the second substrate using both the rubbing alignment process and the optical alignment process.

3. The method according to claim 1, wherein cotton cloth or artificial fiber is used as rubbing cloth in the rubbing alignment process.

4. The method according to claim 2, wherein cotton cloth or artificial fiber is used as rubbing cloth in the rubbing alignment process.

5. The method according to claim 1, wherein when the polyimide film is formed on the first substrate and the second substrate prior to the alignment, the substrate on which the rubbing alignment process is to be used is coated with a common polyimide liquid, the substrate on which the optical alignment process is to be used is coated with a photosensitive polyimide liquid.

6. The method according to claim 2, wherein when the polyimide film is formed on the first substrate and the second substrate prior to the alignment, the substrate on which the rubbing alignment process is to be used is coated with a common polyimide liquid, the substrate on which the optical alignment process is to be used is coated with a photosensitive polyimide liquid.

7. The method according to claim 1, wherein ultraviolet light with a wavelength of 200 nm~400 nm is used in the optical alignment process.

8. The method according to claim 2, wherein ultraviolet light with a wavelength of 200 nm~400 nm is used in the optical alignment process.

9. The method according to claim 7, wherein light accumulation of the ultraviolet light is 30 mj/cm$^2$~2000 mj/cm$^2$.

10. The method according to claim 1, wherein when aligning the polyimide film on the first substrate and the second substrate, the alignment angle is between ±15°.

11. The method according to claim 2, wherein when aligning the polyimide film on the first substrate and the second substrate, the alignment angle is between ±15°.

12. A display panel manufactured by a method according to claim 1.

13. The display panel according to claim 12, being manufactured by a method according to claim 2.

14. The display panel according to claim 12, being manufactured by a method according to claim 3.

15. The display panel according to claim 12, being manufactured by a method according to claim 5.

16. The display panel according to claim 12, being manufactured by a method according to claim 7.

17. The display panel according to claim 12, being manufactured by a method according to claim 9.

18. A display device, comprising a display panel according to claim 12.

* * * * *